United States Patent [19]

Nishigaki et al.

[11] Patent Number: 5,409,433
[45] Date of Patent: Apr. 25, 1995

[54] RUNNING CONTROL APPARATUS FOR ENGINE-DRIVEN VEHICLES

[75] Inventors: Kazuhiro Nishigaki, Gifu; Hitoshi Tasaka, Chiryu; Shigeru Kamio, Nagoya, all of Japan

[73] Assignee: Nippondenso Co., Ltd., Kariya, Japan

[21] Appl. No.: 108,806

[22] Filed: Aug. 19, 1993

[30] Foreign Application Priority Data

Aug. 24, 1992 [JP] Japan .................................. 4-223781

[51] Int. Cl.⁶ ............................................ F16H 59/14
[52] U.S. Cl. ...................................................... 477/108
[58] Field of Search ........................................... 477/108

[56] References Cited

U.S. PATENT DOCUMENTS

| | | | |
|---|---|---|---|
| 4,353,272 | 10/1982 | Schneider et al. | 477/43 |
| 4,898,138 | 2/1990 | Nishimura et al. | 123/399 |
| 4,930,374 | 6/1990 | Simonyi et al. | 477/62 |
| 5,088,043 | 2/1992 | Akishino et al. | 364/426.01 |
| 5,113,721 | 5/1992 | Polly | 364/424.1 |
| 5,150,635 | 9/1992 | Minowa et al. | 477/43 |
| 5,251,138 | 10/1993 | Katayama | 364/426.04 |
| 5,251,512 | 10/1993 | Koenig et al. | 364/424.1 |

FOREIGN PATENT DOCUMENTS 1158255 6/1989 Japan .

Primary Examiner—Dirk Wright
Attorney, Agent, or Firm—Cushman, Darby & Cushman

[57] ABSTRACT

A running control apparatus for an engine-driven vehicle includes a throttle command setting unit for setting a throttle command value based on an accelerator operation degree detected by an accelerator operation degree detector, and a throttle opening and closing driving unit controlled by a throttle opening and closing control unit for adjusting the opening of a throttle valve to the throttle command value, the throttle command value being set to change at a change rate smaller than a change rate of the accelerator operation degree in a region where the accelerator operation degree is small, while, to change at the change rate larger than the change rate of the accelerator operation degree in a region where the accelerator operation degree is large, and the running control apparatus further includes an A/T load signal setting unit and an automatic transmission control unit, in which the A/T load signal setting unit sets an A/T load signal so that the A/T load signal approximates to the throttle command value as the accelerator operation degree decreases, while, the A/T load signal approximates to the accelerator operation degree as the accelerator operation degree increases, and the automatic transmission control unit performs speed change control of an automatic transmission based on the A/T load signal and a vehicle speed signal detected by a vehicle speed detector.

6 Claims, 5 Drawing Sheets

RUNNING CONTROL APPARATUS FOR ENGINE-DRIVEN VEHICLES

BACKGROUND OF THE INVENTION

The present invention relates to a running control apparatus for engine-driven vehicles, and particularly to a vehicle running control apparatus in which an opening of a throttle valve in an internal combustion engine is controlled electrically in accordance with a degree of operation of an accelerator by means of a DC motor or the like, and, at the same time, a speed change of an automatic transmission is controlled in accordance with a speed-change map set preliminarily on the basis of a load imposed on the internal combustion engine and a vehicle speed.

In recent years, there have been proposed various kinds of control apparatuses for electrically controlling the opening of a throttle valve in an internal combustion engine by means of a DC motor or the like. In such apparatuses, a throttle command value is calculated in accordance with a degree of accelerator operation or the like, so that the actual throttle opening is controlled by means of a DC motor by using the throttle command value as a target value. Accordingly, a change rate of the throttle opening, that is, a throttle gain, corresponding to a change rate of the degree of accelerator operation can be set arbitrarily in advance. Such apparatuses have an advantage in that they can adapt themselves exactly to a vehicle running state such as an acceleration request. In most cases, the control apparatus of this type have not only a function of controlling the opening of the throttle valve but also a function of controlling the speed changing operation of the automatic transmission. An example of the apparatuses of this type is disclosed in JP-A 1-158255.

The vehicle running control apparatus of this type controls an actual throttle opening in accordance with an accelerator operation degree or the like by means of a DC motor or the like, and, at the same time, performs transmission control by selecting a speed change stage based on a load on the internal combustion engine and a vehicle speed in accordance with a preliminarily set map. At the time of ordinary running, the accelerator operation degree detected by the throttle control is used as a parameter indicating the engine load to thereby select the speed change stage based on the accelerator operation degree and the vehicle speed. At the time of constant speed running control (cruise control), since there is no connection between the accelerator operation degree and the engine load, the speed change stage is selected based on the throttle opening and the vehicle speed.

As described above, at the time of ordinary running of the vehicle, since the conventional vehicle running control apparatus performs transmission control based on the accelerator operation degree and the vehicle speed, speed changing is performed with the similar frequency at every region of the accelerator operation range. However, a driver's request in speed changing varies depending on a region of the accelerator operation degree. In a region where the accelerator operation degree is relatively large, for example, shifting down for acceleration is required, and therefore it is necessary to perform speed changing sensitively in response to a change of the accelerator operation degree. While, in a region where the accelerator operation degree is relatively small, for example, smooth constant speed running or starting of the vehicle is required, and therefore it is necessary to prevent inadvertent speed changing when making a change of the accelerator operation degree. In the case where only the accelerator operation degree is used for transmission control as described above, while transmission control is performed substantially in accordance with the driver's intention in a region where the accelerator operation degree is large, in a region where the accelerator operation degree is small, it has occurred that a speed changing operation is caused by a slight change of the accelerator operation degree, contrary to the driver's intention, thereby making it impossible to perform smooth running and resulting in deteriorated drivability.

SUMMARY OF THE INVENTION

It is therefore an object of the present invention to provide a vehicle running control apparatus in which transmission control is performed always in accordance with a driver's request to realize smooth running regardless of an amount of the accelerator operation degree and, accordingly, the drivability of a vehicle can be improved.

As shown in FIG. 1, the vehicle running control apparatus according to the present invention comprises: an accelerator operation degree detecting means M1 for detecting an accelerator operation degree of a vehicle; a throttle opening and closing driving means M4 for driving the opening and closing of a throttle valve M3 of an internal combustion engine M2 mounted on the vehicle; a throttle command value setting means M5 for setting a throttle command value based on the accelerator operation degree detected by the accelerator operation degree detecting means M1 so as to provide a small throttle gain in a region where the accelerator operation degree is small; a throttle opening and closing control means M6 for performing driving control of the throttle opening and closing driving means M4 to adjust the actual opening of the throttle valve M3 to a throttle command value set by the throttle command value setting means M5; a vehicle speed detecting means M7 for detecting a running speed of the vehicle; an A/T load signal setting means M8 for setting an A/T load signal so that the A/T load signal approximates to the throttle command value as the accelerator operation degree detected by the accelerator operation degree detecting means M1 decreases, while, the A/T load signal approximates to the accelerator operation degree as the accelerator operation degree increases; and an automatic transmission control means M10 for performing transmission control of an automatic transmission M9 of the vehicle based on the A/T load signal set by the A/T load signal setting means M8 and the vehicle speed detected by the vehicle speed detecting means M7.

In the present invention, a throttle command value is set by the throttle command value setting means M5 based on the accelerator operation degree detected by the accelerator operation degree detecting means M1, and an actual opening of the throttle valve M3 is adjusted to the throttle command value by the throttle opening and closing driving means M4 under the control of the throttle opening and closing control means M6. At this time, in a region where the accelerator operation degree is small, the throttle command value is set to have a small throttle gain. That is, the throttle command value in the present invention is set so that it changes at a smaller change rate as compared with a change rate of the accelerator operation degree in a range where the accelerator operation degree is small. Then, based on the thus set throttle command value and the accelerator operation degree, the A/T load signal setting means M8 sets an A/T load signal so that the A/T load signal approximates to the throttle command value as the accelerator operation degree decreases, while, the A/T load signal approximates to the accelerator operation degree as the accelerator operation degree increases. Finally, the automatic transmission control means M10 performs transmission control of the automatic transmission M9 based on the A/T load signal and the vehicle speed detected by the vehicle speed detecting means M7.

Since the change rate of the throttle command value is small as compared with the change rate of the accelerator operation degree in a region where the accelerator operation degree is small, the change rate of the A/T load signal, which approximates to the throttle command value, becomes small accordingly. As a result, the automatic transmission control means M10 does not perform speed changing of the automatic transmission M9 even if the accelerator operation degree changes to a small amount, and accordingly inadvertent speed changing contrary to the intention of a driver can be prevented. Furthermore, in a region where the accelerator operation degree is large, the change rate of the A/T load signal, which approximates to the accelerator operation degree, is large, and accordingly the automatic transmission control means M10 performs speed changing of the automatic transmission M9 sensitively in response to the change of the accelerator operation degree, thereby making it possible to perform speed changing exactly in compliance with the driver's intention.

DESCRIPTION OF THE PREFERRED EMBODIMENTS

Embodiments of the present invention will be described below.

First Embodiment

Figure 2:
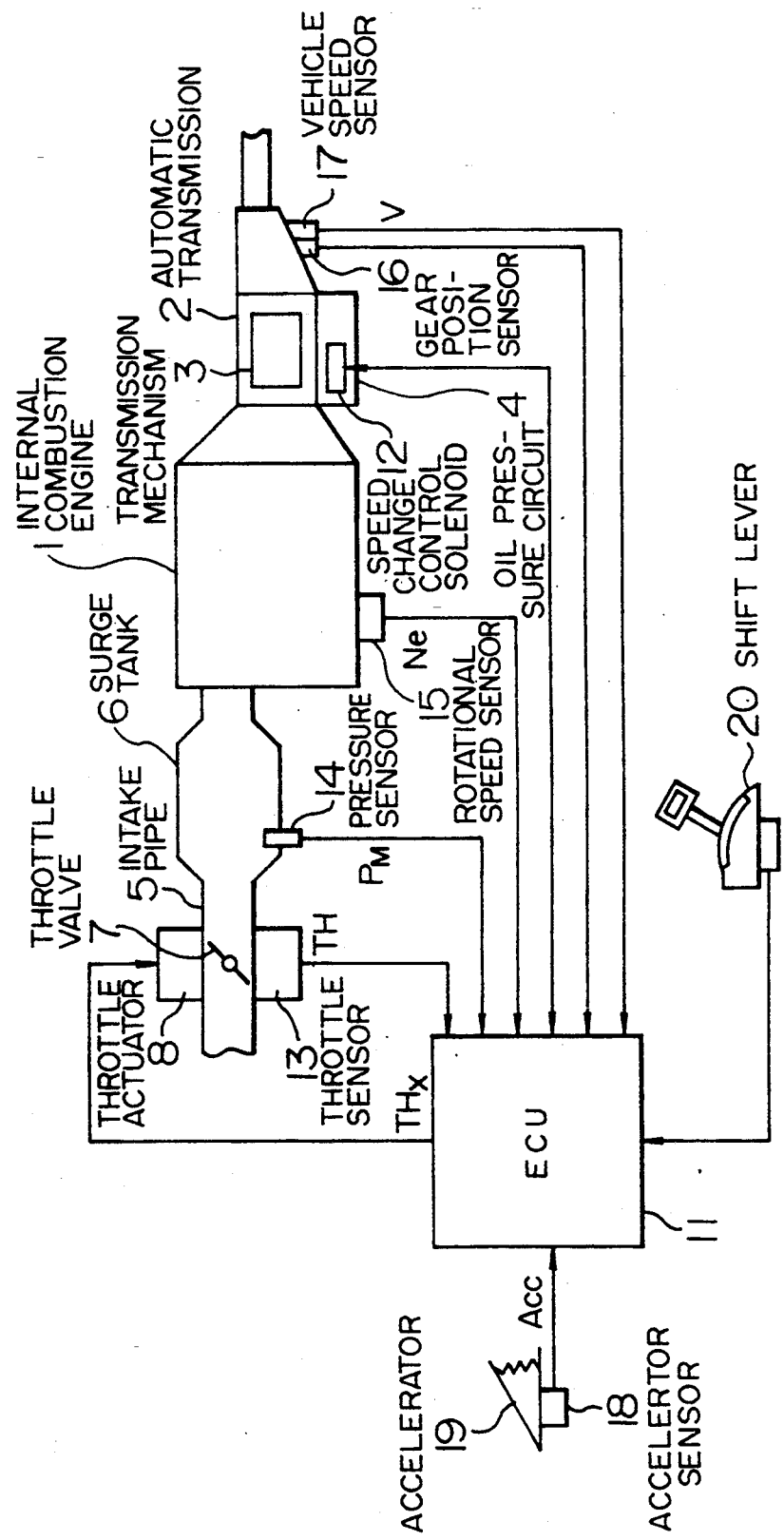
FIG. 2 is a schematic structural diagram showing the construction of a vehicle running control apparatus of the first and second embodiments of the present invention.

FIG. 2 is a schematic structural diagram showing the construction of a running control apparatus for engine-driven vehicles of a first embodiment of the present invention.

As shown in FIG. 2, an automatic transmission 2 is coupled to an internal combustion engine 1 mounted on a vehicle not shown, and the driving torque of the internal combustion engine 1 is transmitted to driving wheels of the vehicle through the automatic transmission 2. A transmission mechanism 3 having a plurality of speed change stages and an oil pressure circuit 4 are included in the automatic transmission 2, and the oil pressure circuit 4 operates to suitably switch the speed change stages of the transmission mechanism 3 to adjust the driving force applied to the driving wheels. The internal combustion engine 1 is supplied with intake air through an intake pipe 5 and a surge tank 6. The quantity of the intake air is controlled by a throttle valve 7 disposed in the intake pipe 5 so that the torque generated by the internal combustion engine 1 is adjusted. A throttle actuator 8 such as a DC motor is coupled to the throttle valve 7, so that the throttle valve 7 is driven to be opened and closed by the throttle actuator 8.

An electronic control unit 11 (hereinafter referred to simply as "ECU") for controlling an operating state of the internal combustion engine 1 includes a logical operation circuit not shown which is composed mainly of a CPU, an ROM and an RAM. Not only the throttle actuator 8 and a speed change control solenoid 12 for controlling the oil pressure circuit 4 of the automatic transmission 2 are connected to the logical operation circuit, but also a throttle sensor 13 for detecting an opening TH of the throttle valve 7, a pressure sensor 14 disposed in the surge tank 6 for detecting the negative pressure PM in the intake pipe 5, a rotational speed sensor 15 for detecting a rotational speed Ne of the internal combustion engine 1, a gear position sensor 16 for detecting a speed change stage of the automatic transmission 2, a vehicle speed sensor 17 for detecting a vehicle speed V and an accelerator sensor 18 for detecting an operating degree Acc of an accelerator 19 of the vehicle are connected to the logical operation circuit. Further, an operating position signal indicating an operating position of a shift lever 20 is supplied to the ECU 11.

As will be described later, the ECU 11 calculates a throttle command value THx based on the accelerator operation degree Acc and the like, controls an actual throttle opening TH to assume the throttle command value THx, produces an A/T load signal LD representing a load state of the internal combustion engine 1 based on the throttle command value THx, and performs transmission control on the automatic transmission 2 in accordance with a speed change map based on the A/T load signal LD and the vehicle speed V.

The processings executed by the ECU 11 in the vehicle running control apparatus having the above-mentioned construction will be described below.

Figure 3:
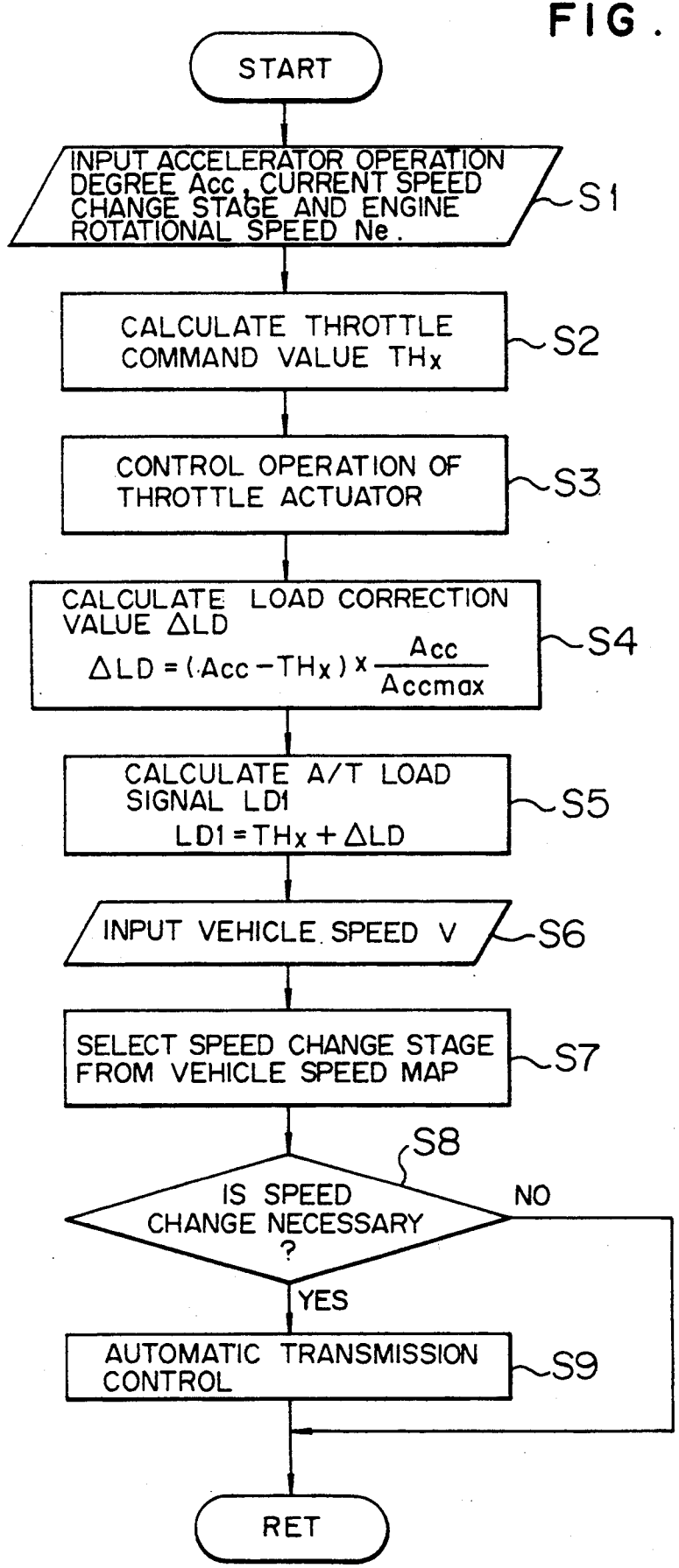
FIG. 3 is a flow chart showing a throttle opening control/transmission control routine executed by an ECU in the vehicle running control apparatus of the first embodiment of the present invention.
Figure 4:
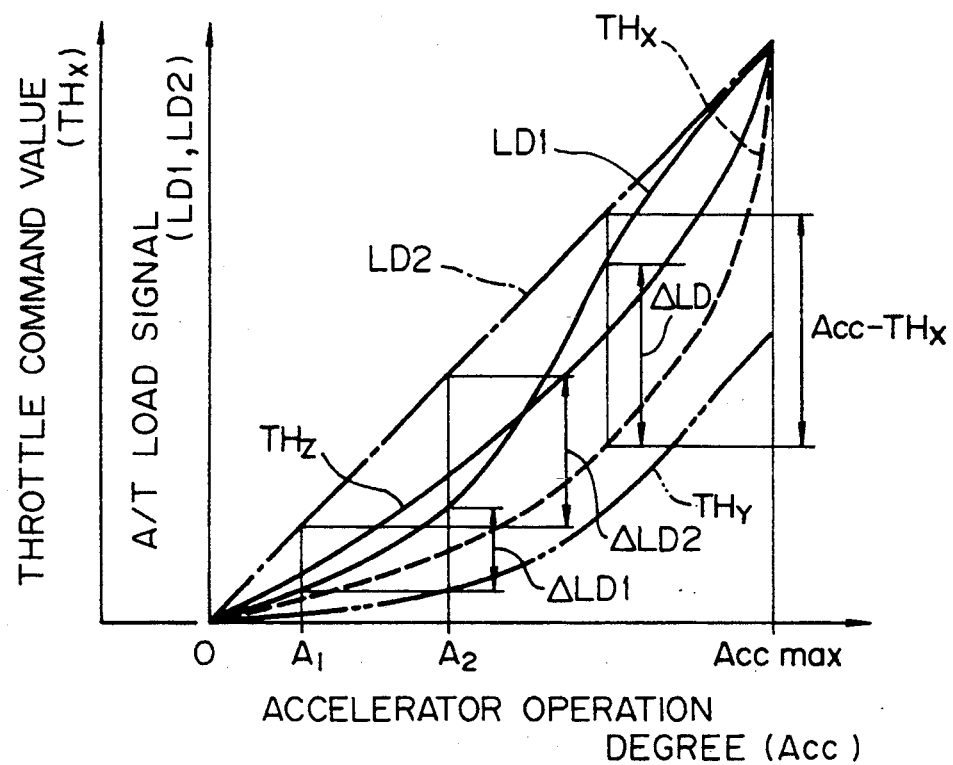
FIG. 4 is an explanatory diagram showing characteristics of a throttle command value and an A/T load signal versus an accelerator operation degree which are calculated by the ECU in the vehicle running control apparatus of the first embodiment of the present invention.

FIG. 3 is a flow chart showing a throttle opening control/transmission control routine executed by the ECU 11 in the vehicle running control apparatus of the first embodiment of the present invention. FIG. 4 is an explanatory diagram showing the characteristics of the throttle command value THx and the A/T load signal LD versus the accelerator operation degree Acc which characteristics are calculated by the ECU 11 in the vehicle running control apparatus of the first embodiment of the present invention. Although the characteristics of two kinds of A/T load signals LD1 and LD2 are shown in FIG. 4, the A/T load signal LD1 indicated by a solid line shows a signal obtained in this embodiment, and the A/T load signal LD2 indicated by the dot-and-dash line shows a signal having a value set in proportion to the accelerator operation degree Acc which is used in the prior art (in other words, a signal indicating the accelerator operation degree Acc itself), the latter A/T load signal LD2 being shown as a comparison signal to be compared with the A/T load signal LD1 and the throttle command value THx of this embodiment.

First, in a step S1, the ECU 11 inputs an accelerator operation degree Acc detected by the accelerator sensor 18, a current speed change stage of the automatic transmission 2 detected by the gear position sensor 16, and an engine rotational speed Ne detected by the rotational speed sensor 15, as parameters necessary for controlling the opening of the throttle valve 7. In a step S2, the ECU 11 calculates a throttle command value THx corresponding to the current accelerator operation degree Acc in accordance with a map set beforehand based on the respective detected values. In a step S3, the ECU 11 controls an operation of the throttle actuator 8 so that an actual throttle opening TH detected by the throttle sensor 13 is set to the throttle command value THx.

As is well known, the throttle command value THx is determined to make the internal combustion engine 1 generate the torque proportional to the accelerator operation degree Acc and is set to assume a value which increases exponentially with an increase of the accelerator operation degree Acc on the abscissa, as shown by a broken line in FIG. 4. That is, the throttle gain (the rate of a change amount of the throttle opening TH to a change amount of the accelerator operation degree Acc) increases from a rate smaller than a predetermined rate toward a predetermined rate, as the accelerator operation degree Acc increases. Accordingly, as compared with a case where the throttle gain is set to a constant rate in the whole region regardless of the accelerator operation degree Acc, for example, (same as the A/T load signal LD2 in FIG. 4), the rate of the change of the throttle command value THx is limited to assume a value smaller than the rate of the change of the accelerator operation degree Acc, particularly in a region where the accelerator operation degree Acc is small. When the accelerator operation degree Acc is small, the driver does not desire rapid acceleration or the like, but the driver desires smooth constant-speed running or smooth starting. Since, in this embodiment, the throttle gain is made small so that delicate adjustment of the throttle opening TH may be made easily, the above-desired smooth constant-speed running or smooth starting can be realized easily.

Further, the map used to calculate the throttle command value is changed depending on the operating position of the shift lever of the automatic transmission 2, or the like. For example, in a reverse stage, the characteristic indicated by THy is selected to suppress the power output. Further, the characteristic indicated by THz, or the like, is selected depending on the running state (that is, the engine rotational speed) or the operation by the driver of the vehicle.

Next, in a step S4, the ECU 11 calculates a load correction value $\Delta LD$ for use in the calculation of the A/T load signal LD1, in accordance with the following equation:

$$\Delta LD = (Acc - THx) \times Acc/Accmax$$

where Accmax represents a maximum operation degree of the accelerator 19. As will be seen from the above equation, the load correction value $\Delta LD$ is obtained by increasing a difference between the accelerator operation degree Acc and the throttle command value THx in accordance with the operation rate (Acc/Accmax) of the accelerator 19. Therefore, as shown in FIG. 4, the load correction value $\Delta LD$ is set as follows: it is set to a small value in a region where the accelerator operation degree Acc is small; it is set to a large value with an increase of the accelerator operation degree Acc; and it is set to a small value in a region where the accelerator operation degree Acc approaches the maximum operation degree Accmax, since a difference between the accelerator operation degree Acc and the throttle command value THx decreases.

Then, in a step S5, the A/T load signal LD1 is calculated in accordance with the following equation.

$$LD1 = THx + \Delta LD$$

Accordingly, as expressed by a solid line in FIG. 4, the A/T load signal LD1 approximates to the throttle command value THx as the accelerator operation degree Acc becomes smaller, the A/T load signal LD1 approximates to the A/T load signal LD2 (the signal indicating the accelerator operation degree Acc itself, as described before) set in proportion to the accelerator operation degree Acc as the accelerator operation degree Acc becomes larger, and the A/T load signal LD1 changes slowly in an intermediate region between the side of the throttle command value THx and the side of the A/T load signal LD2. As a result, particularly in the region where the accelerator operation degree Acc is smaller, the rate of the change of the A/T load signal LD1 is made small as compared with the rate of the change of the A/T load signal LD2.

Then, in a step S6, the ECU 11 inputs a vehicle speed V detected by the vehicle speed sensor 17. In a step S7, the ECU 11 selects a speed change stage in accordance with the speed change map stored beforehand in the ROM, based on the vehicle speed V and the A/T load signal LD1. Then, in a step S8, the selected speed change stage is compared with the current speed change stage. If the speed change stages differ from each other, a decision is made that speed changing is necessary. Upon making this decision, in a step S9, a control signal is sent to the speed change control solenoid 12 of the automatic transmission 2 to thereby switch the speed change stage. Thereafter, this routine is terminated.

Figure 5:
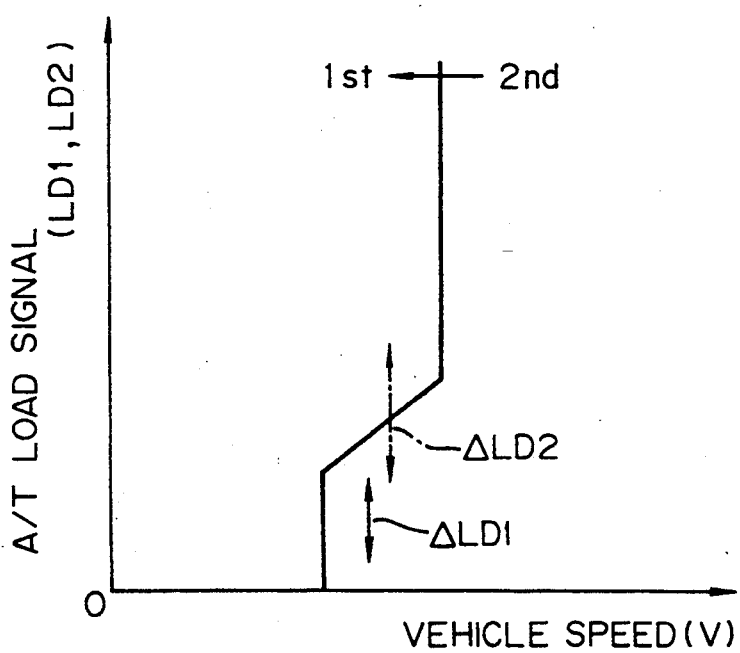
FIG. 5 is an explanatory diagram showing a speed change map for shifting down from the second speed to the first speed which is used by the ECU when performing transmission control in the vehicle running control apparatus of the first embodiment of the present invention.

Referring to FIGS. 4 and 5, a comparison is made between the case where the A/T load signal LD1 is used for transmission control as is the case with this embodiment, and the case where the accelerator operation degree Acc itself (the A/T load signal LD2) is used for transmission control as is the case with the prior art.

FIG. 5 is an explanatory diagram showing a speed change map for shifting down from the second speed to the first speed which is used by the ECU when performing transmission control in the vehicle running control apparatus of the first embodiment of the present invention.

Assume now that, in a region where the accelerator operation degree Acc is small, the accelerator 19 is depressed from point A1 to point A2 within a relatively small range, as shown in FIG. 4, while the vehicle is running at a constant speed after the speed change stage of the automatic transmission 2 has been switched to the second speed stage. Although both of the A/T load signals LD1 and LD2 increase with an increase (A2−A1) of the accelerator operation degree Acc, the increase ΔLD2 of the A/T load signal LD2 is equal to the increase (A2−A1) of the accelerator operation degree Acc, an increase ALD1 of the A/T load signal LD1 is smaller than the value (A2−A1). As a result, as shown in the speed change map of FIG. 5, since the increase ΔLD2 is large, a possibility of shifting down from the second speed stage to the first speed stage is considerably high, when transmission control is made based on the A/T load signal LD2 used in the prior art. On the contrary, when transmission control is made based on the A/T load signal LD1 used in this embodiment, the increase ΔLD1 is small and hence a possibility of shifting down is low. Similarly, even when the accelerator 19 is released in a region where the accelerator operation degree Acc is small, while the vehicle is running at a constant speed, since an amount of a decrease of the A/T load signal LD1 is small, a possibility of shifting up is low.

When the accelerator operation degree Acc is small, a driver is expecting smooth constant-speed running or smooth starting, for example. Particularly, in the case where a large torque change of the driving wheels takes place at the time of speed changing, for example, between the first speed stage and the second speed stage, it is necessary to avoid speed changing. However, since a possibility of making a speed change is low as described above, such an undesirable speed change, which is not intended by the driver, can be prevented.

As described above, in a region where the accelerator operation degree Acc is large, the A/T load signal LD1 is set to approximate to the accelerator operation degree Acc. Therefore, due to a large change value of the A/T load signal LD1 in this region, the A/T load signal LD1 increases greatly when, the driver presses down the accelerator 19 to accelerate the running vehicle, for example. Accordingly, shifting down is performed promptly in response to an increase of the accelerator operation degree Acc, as desired by the driver.

Figure 1:
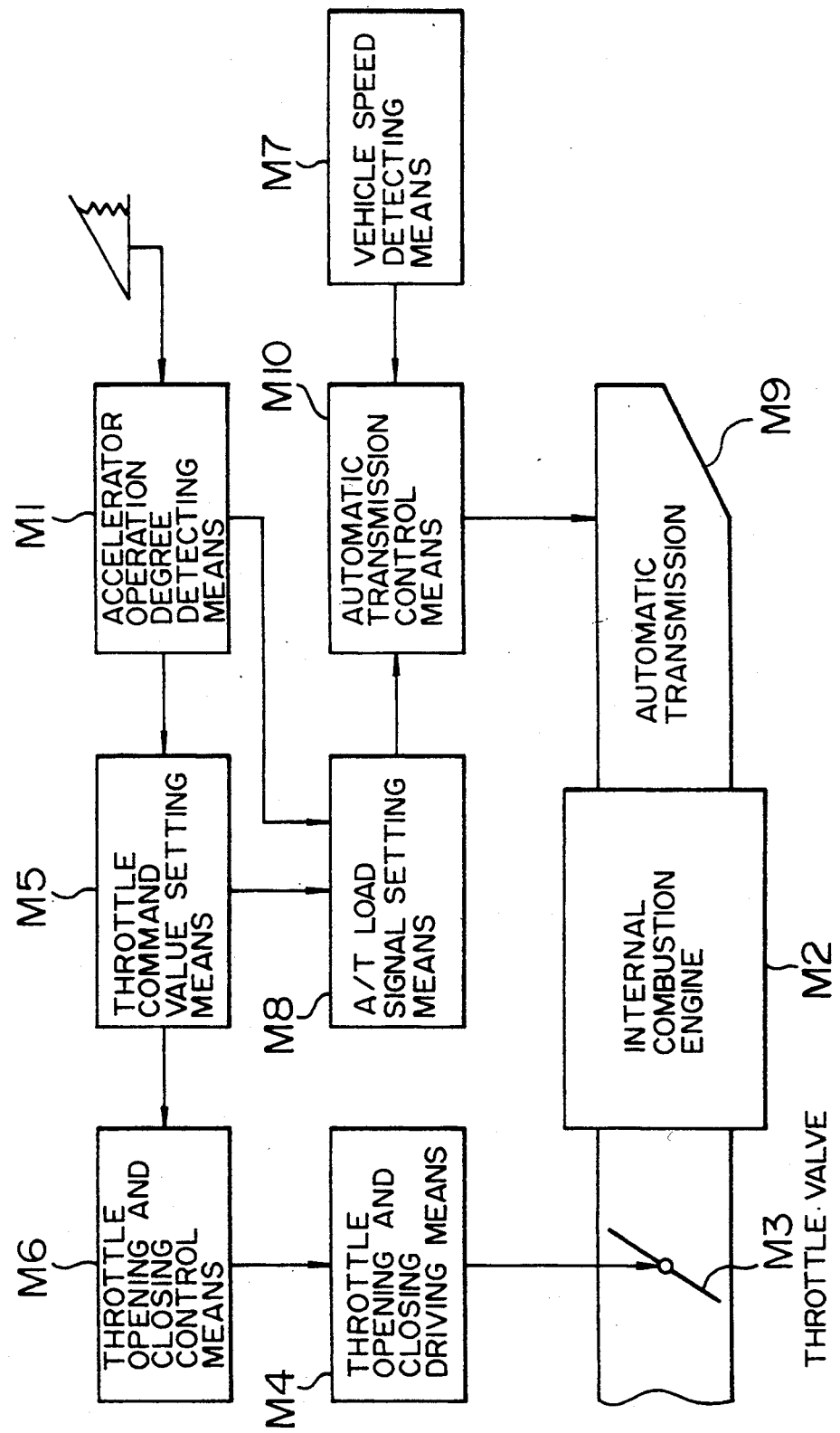
FIG. 1 is a functional block diagram for schematically illustrating the technical concepts of first and second embodiments of the present invention.

As described above, referring to FIGS. 1 and 2, in this embodiment, the accelerator sensor 18 functions as an accelerator operation degree detecting means M1, the internal combustion engine 1 as an internal combustion engine M2, the throttle value 7 as a throttle valve M3, and the throttle actuator 8 as a throttle opening and closing driving means M4. Further, the ECU 11 processing the steps S1 and S2 functions as a throttle command value setting means M5, the ECU 11 processing the step S3 functions as a throttle opening and closing control means M6, the vehicle speed sensor 17 functions as a vehicle speed detecting means M7, the ECU 11 processing the steps S4 and S5 functions as an A/T load signal setting means M8, the automatic transmission 2 functions as an automatic transmission M9, and the ECU 11 processing the steps S6 through S9 functions as an automatic transmission control means M10.

As described above, the vehicle running control apparatus of the first embodiment is constituted by: an accelerator sensor 18 for detecting the accelerator operation degree Acc of a vehicle; a throttle actuator 8 for driving the opening and closing of the throttle valve 7 of an internal combustion engine 1 mounted on the vehicle; a vehicle speed sensor 17 for detecting the running speed of the vehicle; and an ECU 11 which sets a throttle command value THx to have a small throttle gain, in a region where the accelerator operation degree Acc is small, based on the accelerator operation degree Acc detected by the accelerator sensor 18 (as shown by the steps S1 and S2); which adjusts the actual opening of the throttle valve 7 to the throttle command value THx by controlling the operation of the throttle actuator 8 (as shown by the step S3); which sets an A/T load signal LD1 so that the A/T load signal LD1 approximates to the throttle command value THx as the accelerator operation degree Acc detected by the accelerator sensor 18 decreases, while, the A/T load signal LD1 approximates to the accelerator operation degree Acc as the accelerator operation degree Acc increases (as shown by the steps S4 and S5), and which performs transmission control of an automatic transmission 2 of the vehicle based on the A/T load signal LD1 and the vehicle speed V detected by the vehicle speed sensor 17 (as shown by the steps S6 to S9).

Accordingly, the throttle command value THx is set to have an exponential characteristic so as to increase the throttle gain in accordance with an increase of the accelerator operation degree Acc, wherein the A/T load signal LD1 is set to approximate to the throttle command value THx as the accelerator operation degree Acc decreases, while, to approximate to the accelerator operation degree Acc as the accelerator operation degree Acc increases. As a result, in a region where the accelerator operation degree Acc is small, since the change rate of the A/T load signal LD1 is small, an inadvertent speed change, which is not intended by the driver, can be prevented even when the accelerator operation degree Acc changes slightly. Furthermore, in a region where the accelerator operation degree Acc is large, since the change rate of the A/T load signal LD1 is large, speed changing can be performed promptly in response to a change of the accelerator operation degree Acc as the driver desires. Thus, transmission control can always be performed, as desired by the driver, to realize smooth running regardless of an amount of the accelerator operation degree Acc, resulting in the improvement of the drivability of the vehicle.

Second Embodiment

A second embodiment of the present invention will be described below.

Figure 6:
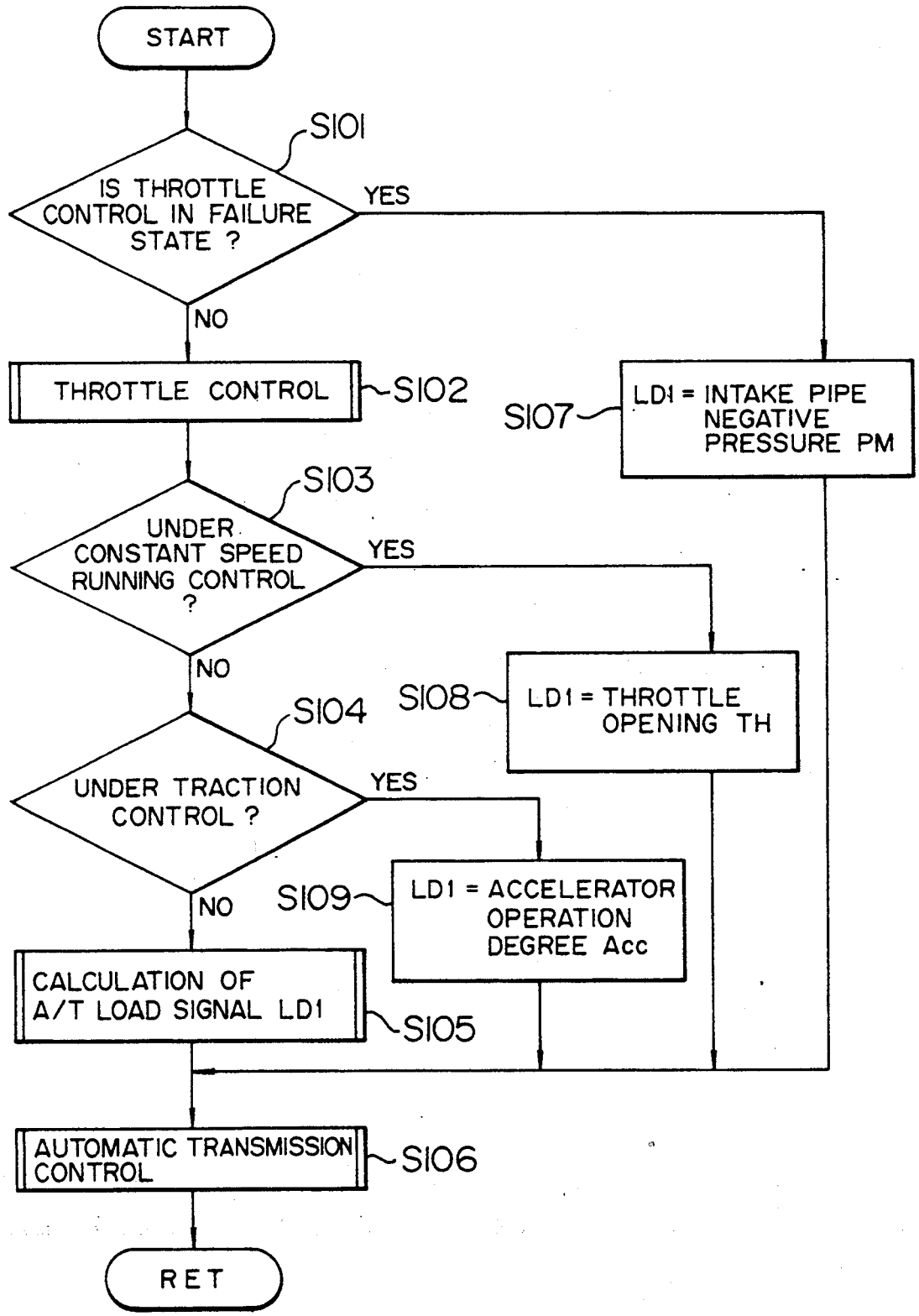
FIG. 6 is a flow chart showing a throttle opening control/transmission control routine executed by the ECU in the vehicle running control apparatus of the second embodiment of the present invention.

FIG. 6 is a flow chart showing a throttle opening control/transmission control routine executed by an ECU of a vehicle running control apparatus of a second embodiment of the present invention. The vehicle running control apparatus in this embodiment is constructed in the same manner as that of the first embodiment, and this second embodiment provides for a throttle opening control failure case, a constant-speed running control case and a traction control case, whereby unusual transmission control is performed in those cases.

Referring to FIG. 6, the processings performed by the ECU 11 will be described below. First, in a step S101, a judgment is made as to whether the opening control of the throttle valve 7 (the processings of the steps S1 to S3 in the flow chart shown in FIG. 3 explained in the first embodiment) is in a state of failure or not. This failure judgment is made based on the degree of matching of the throttle opening TH with the accelerator operation degree Acc, or the like, when constant-speed running control (closed control) or traction control is not performed. That is, constant-speed running control is nauturally a control method in which the opening of the throttle valve 7 is held to have a predetermined value without operating the accelerator to thereby make the vehicle run at a constant speed, and traction control is a control method in which the throttle valve 7 is controlled at a closed state to thereby suppress slipping of driving wheels when the accelerator is depressed excessively at the time of acceleration. In each of the above-mentioned control methods, the correlation between the accelerator operation degree Acc and the throttle opening TH is lost. In other control methods than these control methods, as explained in the steps S1 to S3 in FIG. 3, the relation of the throttle command value THx (=throttle opening TH) versus the accelerator operation degree Acc is set in accordance with the characteristics of FIG. 4. Therefore, when the accelerator operation degree Acc detected by the accelerator sensor 18 and the throttle opening TH detected by the throttle sensor 13 do not match with the characteristics of FIG. 4, a decision is made that the throttle opening control is in a state of failure.

When a decision is made in the step S101 that the opening control of the throttle valve 7 is not in a state of failure but in a normal state, in a step S102, the opening control of the throttle valve 7 is carried out in the same manner as the processings of the steps S1 to S3 in FIG. 3 to thereby adjust the actual throttle opening TH to the throttle command value THx calculated based on the accelerator operation degree Acc. Then, in a step S103, a decision is made as to whether constant-speed running control is currently performed or not. Then, in a step S104, a decision is made as to whether traction control is currently performed or not. If neither control is performed, in a step S105, the processings of calculating the A/T load signal LD1 is carried out in the same manner as the processings of the steps S4 and S5 in FIG. 3. Further, in a step S106, the transmission control of the automatic transmission 2 is carried out in the same manner as the processings of the steps S6 to S9 in FIG. 3. That is, when the opening control of the throttle valve 7 is performed normally and neither constant-speed running control nor traction control is not performed, throttle opening control and transmission control are performed in the same manner as in the first embodiment.

On the other hand, the case where a decision is made in the step S101 that the opening control is in a state of failure, because the accelerator operation degree Acc and the throttle opening TH do not match with each other, is considered to correspond to the case where the throttle valve 7 is locked at a specific opening position. Accordingly, in this case, the actual throttle opening TH does not change irrespective of a change of the accelerator operation degree Acc. As a result, the A/T load signal LD1 calculated based on the accelerator operation degree Acc does not represent the load state of the internal combustion engine 1, and thus the A/T load signal LD1 cannot be used as a transmission control parameter. Therefore, the ECU 11 does not execute the opening control of the throttle valve 7 shown in the step S102. Instead, the ECU 11 uses the negative pressure PM of the intake pipe detected by the pressure sensor 14, in place of the A/T load signal LD1, as a parameter showing the load state of the internal combustion engine 1 in a step S107, and then it executes transmission control shown in a step S106 by using the negative pressure PM. Thus, it becomes possible to prevent the running of the vehicle from being disabled by the state of failure.

When a decision is made in the step S103 that constant-speed running control is currently performed, the opening of the throttle valve 7 is fixed to have a predetermined value regardless of the accelerator operation degree Acc (in most cases, the accelerator 19 has not been depressed so that the accelerator operation degree Acc is zero). Accordingly, similarly to the aforementioned failure case, the A/T load signal LD1 calculated based on the accelerator operation degree Acc does not represent the load state of the internal combustion engine 1, so that the A/T load signal LD1 cannot be used as a transmission control parameter. Therefore, the ECU 11 uses the throttle opening TH detected by the throttle sensor 13 in place of the A/T load signal LD1 in a step 108, and then it performs transmission control shown in the step S106 based on the throttle opening TH.

Further, when a decision is made in the step S104 that traction control is currently performed, the throttle valve 7 is controlled at a closed state irrespective of the accelerator operation degree Acc. As a result, similarly to the aforementioned failure case or constant-speed running control case, the A/T load signal LD1 calculated based on the accelerator operation degree Acc does not represent the load state of the internal combustion engine 1, and thus the A/T load signal LD1 cannot be used as a transmission control parameter. Therefore, the ECU 11 uses the accelerator operation degree Acc detected by the accelerator sensor 18 in place of the A/T load signal LD1 in a step S109, and then it executes transmission control shown in the step S106 based on the accelerator operation degree Acc.

That is, in the second embodiment, when the opening control of the throttle valve 7 is in a state of failure or when constant-speed running control or traction control is currently performed, respective one of the signals representing the intake pipe negative pressure PM, the throttle opening TH and the accelerator operation degree Acc is used as a substitute for the A/T load signal LD1 to thereby make it possible to perform transmission control of the automatic transmission 2.

In the vehicle running control apparatus of the second embodiment, similarly to the first embodiment, the A/T load signal LD1 is set to approximate to the throttle command value THx as the accelerator operation degree Acc decreases, while, it approximates to the accelerator operation degree Acc as the accelerator operation degree Acc increases. Accordingly, in a region where the accelerator operation degree Acc is small, the change rate of the A/T load signal LD1 is small, so that inadvertent speed changing, which is not intended by the driver, can be prevented. On the other hand, in a region where the accelerator operation degree Acc is large, the change rate of the A/T load signal LD1 is large so that speed changing can be performed as desired by the driver. Hence, transmission control can always be performed in compliance with the driver's request to realize smooth running, regardless of the value of the accelerator operation degree Acc, thereby making it possible to improve the drivability of the vehicle.

Besides, though the first and second embodiments show the case where the relation of the throttle command value THx versus the accelerator operation degree Acc is set to have the characteristics shown in FIG. 4, the characteristics can be changed arbitrarily in accordance with a torque characteristic of the internal combustion engine 1, or the like. Further, though the embodiments show the case where the A/T load signal LD1 is set to have the characteristics shown in FIG. 4 based on the accelerator operation degree Acc and the throttle command value THx, the characteristics can be changed arbitrarily in accordance with the setting of the speed change map of the automatic transmission 2, or the like. Accordingly, for example, in a region where the accelerator operation degree Acc is small, the A/T load signal LD1 may be made to exactly coincide with the throttle command value THx in order to prevent inadvertent speed changing.

As described above, in the vehicle running control apparatus of the present invention, a throttle command value having a small throttle gain is set in a region where the accelerator operation degree is small, so that an A/T load signal is set to approximate to the throttle command value as the accelerator operation degree decreases, while, it is set to approximate to the accelerator operation degree as the accelerator operation degree increases. Accordingly, in a region where the accelerator operation degree is small, the change rate of the A/T load signal is small, so that inadvertent speed changing, which is not intended by the driver, can be prevented, even if the accelerator operation degree changes slightly. Furthermore, in a region where the accelerator operation degree is large, the change rate of the A/T load signal is large, so that speed changing can be performed, as desired by the driver, promptly in response to the change of the accelerator operation degree. As a result, it is made possible to perform transmission control always in compliance with the driver's request, regardless of the value of the accelerator operation degree, thereby realizing smooth running and improving the drivability of the vehicle.

It is claimed:

1. A running control apparatus for an engine-driven vehicle, comprising:

an accelerator operation degree detecting means for detecting an accelerator operation degree of the vehicle;

a throttle opening and closing driving means for driving the opening and closing of a throttle valve of an internal combustion engine mounted on the vehicle;

a throttle command value setting means for setting a throttle command value based on an accelerator operation degree detected by said accelerator operation degree detecting means so that the throttle command value has a smaller change rate than a change rate of the accelerator operation degree in a region where the accelerator operation degree is small, while, the throttle command value has a larger change rate than the change rate of the accelerator operation degree in a region where the accelerator operation degree is large;

a throttle opening and closing control means for performing driving control of said throttle opening and closing driving means to adjust an actual opening of the throttle valve to the throttle command value set by said throttle command value setting means;

a vehicle speed detecting means for detecting a running speed of the vehicle;

an A/T load signal setting means for setting an A/T load signal so that the A/T load signal approximates to the throttle command value as the accelerator operation degree detected by said accelerator operation degree detecting means decreases, while, the A/T load signal approximates to a value of the accelerator operation degree as the accelerator operation degree increases; and an automatic transmission control means for performing transmission control of an automatic transmission of the vehicle based on the A/T load signal set by said A/T load signal setting means and the vehicle speed detected by said vehicle speed detecting means.

2. A running control apparatus for an engine-driven vehicle in which an output of an internal combustion engine is adjusted in accordance with an operation degree of an accelerator and a rotational speed of said internal combustion engine is shifted down by an automatic transmission to thereby drive the vehicle, said apparatus comprising:

an accelerator operation degree detecting means for detecting the accelerator operation degree provided by a driver;

an output adjustment means for setting an adjustment value for adjusting the output of said internal combustion engine by changing the accelerator operation degree detected by said accelerator operation degree detecting means based on a predetermined characteristic, thereby operating an output adjustment member based on said adjustment value;

a vehicle speed detecting means for detecting a running speed of the vehicle;

a load signal setting means for setting a load signal based on the accelerator operation degree detected by said accelerator operation degree detecting means and the adjustment value for said output adjustment member set by said output adjustment means so that the load signal assumes a value between the accelerator operation degree and the adjustment value; and an automatic transmission control means for performing transmission control of the automatic transmission in accordance with the vehicle speed detected by said vehicle speed detecting means and the load signal set by said load signal setting means.

3. A running control apparatus for an engine-driven vehicle according to claim 2, in which said load signal setting means sets said load signal to approximate to the adjustment value for said output adjustment member in a region where the accelerator operation degree is small, while, to approximate to the accelerator operation degree in a region where the accelerator operation degree is large.

4. A running control apparatus for an engine-driven vehicle according to claim 3, in which said output adjustment means operates said output adjustment member to render a change value of the adjustment value smaller than a change value of the accelerator operation degree in a region where the accelerator operation degree is small.

5. A running control apparatus for an engine-driven vehicle according to claim 3, in which said output adjustment means operates said output adjustment member to render a change value of the adjustment value smaller than a change value of the accelerator operation degree in a region where the accelerator operation degree is small, while, to render the change value of the adjustment value larger than the change value of the accelerator operation degree in a region where the accelerator operation degree is large.

6. A running control apparatus for an engine-driven vehicle according to claim 3, in which said output adjustment means operates said output adjustment member by changing the accelerator operation degree based on selected one of a plurality of predetermined characteristics.

* * * * *